United States Patent
Joly et al.

(10) Patent No.: US 7,268,184 B2
(45) Date of Patent: *Sep. 11, 2007

(54) BLOCKCOPOLYMER COMPOSITIONS, HAVING IMPROVED MECHANICAL PROPERTIES AND PROCESSABILITY AND STYRENIC BLOCKCOPOLYMER TO BE USED IN THEM

(75) Inventors: Gert Joly, Louvain-la-Neuve (BE); Jaak L. Moerenhout, Louvain-la-Neuve (BE); Catherine A. L. Maris, Louvain-la-Neuve (BE); Sonja M. Oosterbosch, Louvain-la-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/510,273

(22) PCT Filed: Jan. 13, 2003

(86) PCT No.: PCT/EP03/00277

§ 371 (c)(1),
(2), (4) Date: Oct. 5, 2004

(87) PCT Pub. No.: WO03/064527

PCT Pub. Date: Aug. 7, 2003

(65) Prior Publication Data

US 2006/0030665 A1 Feb. 9, 2006

(30) Foreign Application Priority Data

Jan. 31, 2002 (EP) .................................. 02075463
Oct. 24, 2002 (EP) .................................. 02079638

(51) Int. Cl.
*C08L 53/02* (2006.01)

(52) U.S. Cl. .................... 525/88; 525/89; 525/92 D; 525/98

(58) Field of Classification Search ................ 525/89, 525/98, 92 D, 88
See application file for complete search history.

(56) References Cited

U.S. PATENT DOCUMENTS

| | | |
|---|---|---|
| 3,113,986 A | 12/1963 | Breslow et al. |
| RE27,145 E | 6/1971 | Jones |
| 4,226,952 A | 10/1980 | Halasa et al. |
| 4,663,220 A | 5/1987 | Wisneski et al. |
| 4,789,699 A | 12/1988 | Kieffer et al. |
| 4,970,259 A | 11/1990 | Mitchell et al. |
| 5,039,755 A | 8/1991 | Chamberlain et al. |
| 5,093,422 A | 3/1992 | Himes |
| 5,346,964 A | 9/1994 | Shibata et al. |
| 5,627,235 A | 5/1997 | Himes |
| 5,705,556 A | 1/1998 | Dijauw et al. |
| 5,777,031 A | 7/1998 | Djiauw et al. |
| 5,777,043 A * | 7/1998 | Shafer et al. ............... 525/339 |
| 6,042,907 A | 3/2000 | Blackwelder et al. |
| 6,406,653 B1 | 6/2002 | Blackwelder et al. |
| 7,001,956 B2 * | 2/2006 | Handlin et al. ............ 525/342 |

FOREIGN PATENT DOCUMENTS

| | | |
|---|---|---|
| EP | 0 254 346 B1 | 1/1993 |
| EP | 0 413 262 B1 | 1/1996 |
| EP | 0 822 227 A1 | 2/1998 |
| EP | 1 061 099 A1 | 12/2000 |
| EP | 0 863 193 B1 | 12/2002 |
| WO | 01/09239 A1 | 2/2001 |
| WO | 01/19919 A1 | 3/2001 |
| WO | 02/28965 A1 | 4/2002 |

\* cited by examiner

*Primary Examiner*—Jeffrey Mullis
(74) *Attorney, Agent, or Firm*—Donna B. Holguin; Novak, Druce & Quigg LLP

(57) ABSTRACT

A composition to be used for the manufacture of fibers, filaments, melt blown or spun bond non-wovens or cast or blown films, comprising at least 50 wt % of a styrenic block copolymer; a polyolefin in an amount of from 10 to 30 wt %; a resin which is compatible with the poly(styrene) blocks in the styrenic block copolymer in an amount of at least 5 wt %, and a resin which is compatible with the hydrogenated polybutadiene blocks in the styrenic block copolymer an amount of at least 3 wt %, wherein all weight percentages are relative to the weight of the complete composition; styrenic block copolymers to be used therein; and fibers, melt blown or spun bond non-wovens or cast or blown films prepared from it.

32 Claims, No Drawings

BLOCKCOPOLYMER COMPOSITIONS, HAVING IMPROVED MECHANICAL PROPERTIES AND PROCESSABILITY AND STYRENIC BLOCKCOPOLYMER TO BE USED IN THEM

FIELD OF THE INVENTION

The invention relates to blockcopolymer compositions with improved mechanical properties and processability and to modified styrenic blockcopolymer to be used in them.

In particular, the invention relates to compositions comprising a modified hydrogenated styrene butadiene blockcopolymer, to be used for the manufacture of fibers, filaments, melt blown or spun bond non-wovens or cast or blown films.

BACKGROUND OF THE INVENTION

Elastomeric compounds which can be easily extruded, spunbond or melt blown into elastic fibers or films having low stress relaxation, low hysteresis or permanent set, and high recoverable energy are described in U.S. Pat. Nos. 4,663,220, 4,789,699, 4,970,259, 5,093,422, 5,705,556 and many others. The elastomeric fibers or films are useful in making a variety of applications such as diaper waistbands and non-woven fabrics.

Polystyrene-poly(ethylene-butylene)-polystyrene elastomeric block copolymers have been compounded with other materials such as, for example, polyolefins and tackifying resins to form extrudable elastomeric compositions which can be more easily extruded into elastic fibers or films having improved processing and/or bonding properties. Processes for making cast extruded films, extrusion blown films, extruded fibers, filaments, non-wovens and such like have high requirements around viscosity of the compound. At the same time, applications of these extrudates in personal hygiene, food wrapping and the like result in stringent requirements on mechanical behavior; a combination of stiffness (high modulus), and excellent elasticity (good stress-relaxation and low hysteresis and permanent set) is needed. One of the greatest challenges in this field is to find a good balance between flow/viscosity and the mechanical properties mentioned above.

It is an object of the present invention to provide compositions that have excellent balance of properties in personal hygiene applications (fibers, filaments, non-wovens or cast or blown films).

SUMMARY OF THE INVENTION

Accordingly a composition is provided, which can be used for the manufacture of fibers, filaments, melt blown or spun bond non-wovens or cast or blown films, comprising at least 50 wt % of a styrenic block copolymer having a molecular structure according to the general formulae S-EB-S(1) or (S-EB)$_n$X(2), wherein each S independently is a polymer block of predominantly styrene and EB is a hydrogenated polymers block of predominantly butadiene, n is an integer equal to or greater than 2, and X is the residue of a coupling agent, having a poly(styrene) content in the range of from 10 to 29% by weight (wt %), preferably from 17 to 24 wt %, having poly(styrene) blocks (S) of an apparent molecular weight in the range of from 6,000 to 9,000 and preferably from 7,000 to 8,500, having an apparent molecular weight of the complete block copolymer in the range of from 80,000 to 150,000, having an 1,2 addition degree (vinyl content) in the precursor of the poly (butadiene) block (EB) in the range of from 60 to 80% (mole/mole), wherein the block EB has a hydrogenation degree of at least 80% and preferably at least 90%, and wherein diblock S-EB optionally occurs in a content of at most 20 mole % and preferably at most 10 mole %; a polyolefin in an amount of from 10 to 30 wt %; a resin which is compatible with the poly(styrene) blocks in an amount of at least 5 wt %, and a resin which is compatible with the hydrogenated polybutadiene blocks in an amount of at least 3 wt %, wherein all weight percentages are relative to the weight of the complete composition.

In addition modified styrenic block copolymers are provided which have been found to be in particular suitable in the compositions for the manufacture of fibers, filaments and melt blown or spun bond non-wovens or cast or blown films. Said products are applied for personal hygiene applications.

Accordingly styrenic block copolymers are provided to be used in compositions for the manufacture of fibers, filaments, melt blown or spun bondnon-wovens, wherein i. the poly(styrene) content (PSC) is from 17 to 24 wt %,
ii. the styrenic block copolymer has a molecular structure according to the general formulae $$\text{S-EB-S} \quad (1) \text{ or } (\text{S-EB})_n\text{X}(2),$$

wherein each S independently is a polymer block of styrene and EB is a hydrogenated polymer block of butadiene, n is an integer equal to or greater than 2, and X is the residue of a coupling agent, iii. the apparent molecular weight of the poly(styrene) blocks (S) is in the range of from 7,000 to 8,500,
iv. the apparent molecular weight of the complete styrenic block copolymer is in the range of from 80,000 to 150,000,
v. the 1.2 addition degree (vinyl content) in the precursor poly (butadiene) block (EB) precursor is in the range of from 60 to 80 (mole/mole),
vi. the block EB has a hydrogenation degree of at least 80% and preferably of at least 90%, and
vii. an optional diblock S-EB content of at most 20 mole % and preferably of at most 10 mole %, relative to the total block copolymer amount.

DETAILED DESCRIPTION OF THE INVENTION

Compositions according to the present invention comprise at least 50 wt % of at least one block copolymer, derived from predominantly styrene and predominantly butadiene.

Preferably said compositions comprise said block copolymer(s) in weight proportions of from 50 to 70 wt % and more preferably from 55 to 65 wt %.

Said compositions comprise in addition to the block copolymer a polyolefin in a weight proportion of from 10 to 30 wt % and preferably of from 15 to 20 wt %; a polystyrene block compatible resin in a weight proportion of at least 5 wt % and preferably of from 5 to 15 wt % and more preferably from 8 to 12 wt %; and at least 3 wt % of a hydrogenated polybutadiene compatible resin, preferably of from 3 to 10 wt % and more preferably of from 5 to 10 wt %, relative to the weight of the total composition.

With the terms "predominantly styrene" and "predominantly butadiene" respectively, as used throughout the specification, are meant that for the respective blocks to be prepared, substantially pure styrene or mixtures comprising at least 95 wt % of styrene and minor amounts of other comonomers can be used, and substantially pure butadiene or mixtures comprising at least 95 wt % of butadiene and minor amounts of other comonomers, can be used.

The small proportions of other comonomers in the polystyrene blocks can consist of structurally related comonomers such as alpha-methyl styrene, p-methyl styrene, o-methyl styrene, p-test.butyl styrene, dimethyl styrene and vinyl naphthalene, or butadiene.

The small proportions of other comonomers in the poly (butadiene) block can consist of isoprene or styrene.

However, preferred block copolymers to be applied according to the present invention, contain blocks of substantially pure styrene and substantially pure butadiene.

The block copolymer according to the present invention may be branched or linear and may be a triblock, tetrablock or multiblock.

It has a structure represented by the following general formulae

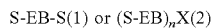

S-EB-S(1) or (S-EB)$_n$X(2)

wherein each S independently is a polymer block predominantly styrene, and EB is a hydrogenated polymer block of predominantly butadiene, having a hydrogenation degree of at least 80%, preferably at least 90% and more preferably more than 95%, wherein n is an integer equal to or greater than 2 and wherein X is the residue of a coupling agent.

The polymer blocks S have an apparent molecular weight in the range of from 6,000 to 9,000 and preferably from 7,000 to 8,500.

In the block copolymers according to the present invention, the PSC is in the range of 10-29% w, preferably 17-24% w based on the total block copolymer. The 1,2 addition (vinyl content) in the midblock precursor is in the range of 60 to 80%, preferably in the range of 65 to 75%.

The complete block copolymers according to the present invention each preferably have a total apparent molecular weight (Mw, determined by Gel Permeation Chromatography and expressed in terms of polystyrene) ranging from 80,000 to 150,000, preferably from 100,000 to 120,000 (using the method described by J. R. Runyon et al in J. Polym. Sci., 13, 2359 (1969)).

The block copolymers according to the present invention can be made e.g. by coupling living diblock copolymer prepared by anionic polymerization with a coupling agent or by sequential polymerization. The latter is preferred.

It will be appreciated the block copolymers, prepared by means of coupling of living diblock. copolymers by means of a coupling agent and termination of remaining living block copolymers, will finally contain small amounts (i.e. less than 20 mole % and preferably less than 10 mole %) of diblock copolymer, having the same S blocks (mole % relative to the weight of the total block copolymer).

Preferred block copolymers to be used in the compositions of the present invention do not contain any detectable amount of diblock copolymer.

As examples of the coupling agent may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, diethyldichlorosilane, monobutyldichlorosilane, dibutyldichlorosilane, monohexyldichlorosilane, dihexyldichlorosilane, dibromosilane, monomethyldibromosilane, dimethyldibromosilane, silicon tetrabromide and silicon tetrabromide; alkoxysilanes such as tetramethoxysilane; divinyl aromatic compounds such as divinylbenzene en divinyl naphthalene; halogenated alkanes such as dichloroethane, dibromoethane, methylene chloride dibromomethane, dichloropropane, dibromopropane, chloroform, trichloroethane, trichloropropane and tribromopropane; halogenated aromatic compounds such as dibromobenzene; epoxy compounds such as the diglycidyl ether of bisphenol-A (e.g. EPON 825, a trademark), and other coupling agents such as benzoic esters, CO$_2$, 2-chloroprene and 1 chloro-1,3-butadiene. Of these EPON 825, dibromobenzene, tetramethoxysilane and dimethyldichlorosilane are preferred.

The anionic polymerization of the conjugated diene hydrocarbons is typically controlled with structure modifiers such as diethyl ether or ethyl glyme (1,2-diethoxyethane), to obtain the desired amount of 1,2-addition. As described in Re 27,145 which is incorporated by reference herein, the level of 1,2-addition of a butadiene polymer or copolymer can greatly affect elastomeric properties after hydrogenation. The 1,2-addition of butadiene polymers significantly and surprisingly additionally influences the polymer as described above. More in particular, a 1,2-addition of 78% (within the scope of this invention) is achieved during polymerization by the presence of about 300 ppm of 1,2-diethoxypropane (DEP) in the final solution.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula

Rli wherein R is an aliphatic,cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

It will be appreciated that the EB blocks in the finally applied block copolymers preferably have been selectively hydrogenated to a degree of at least 95%, whereas the poly(styrene) blocks have not been hydrogenated or only in a degree of at most 5%.

The hydrogenation of these polymers may be carried out by a variety of well established processes including hydrogenation in the presence of such catalysts as Raney Nickel, noble metals such as platinum and palladium and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalyst. Such processes are disclosed in U.S. Pat. Nos. 3,113,986, 4,226,952 and Reissues 27,145, the disclosure of which are herein incorporated by reference. The polymers are hydrogenated in such a manner as to produce hydrogenated polymers having a residual unsaturation content in polydiene blocks of less than 5 percent by weight, preferably less than 1% wt and more preferably as close to 0 percent as possible, of their original unsaturation contant prior to hydrogenation. A titanium catalyst such as disclosed in U.S. Pat. No. 5,039,755, which is herein incorporated by reference, may also be used in the hydrogenation process.

The finally applied selectively hydrogenated block copolymers can also consist of mixtures of linear block copolymers or of mixtures of linear block copolymer and branched block copolymers.

The polyolefin used in the compositions of the present invention is preferably polypropylene (PP) or polyethylene (PE), more preferably a high MFR PP (i.e., having a melt flow rate as determined at 230° C./2.16 kg, in accordance to ASTM D1238-95 of greater than 400 gr/10 min.). Suitable polyolefins having an MFR of about 800 gr/10 min are "VALTEC" HH442 or "MOPLEN" HF568 by Basell (trademarks), "BORFLOW" HL508 by Borealis and "MIRAEPOL PA189V" by PolyMirae (trademarks). The polyolefin is preferably used in an amount of from 15 to 25% w (on the total compound).

The polystyrene block compatible resin may be selected from the group consisting of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALLEX", "NEVCHEM" and "PICCOTEX". A very suitable resin is "KRISTALLEX" F-100. The compound preferably comprises from 8 to 12% w of the polystyrene block compatible resin.

Resins compatible with the hydrogenated polybutadiene (mid)block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON". A very suitable resin is "REGALITE" R-1125. The compound preferably comprises from 5 to 10% w of the (mid)block compatible resin.

It will be appreciated that another aspect of the present invention is formed by the fibers, filaments, melt blown or spun bond non-wovens or cast or blown films, obtained by processing the hereinbefore defined compositions.

A further aspect of the present invention is formed by the specific block copolymers to be used in the compositions for the manufacture of fibers, filaments, melt blown or spun bond non-wovens or cast or blown films.

The compositions of the embodiments may contain a plasticizer. However, as plasticizers have the tendency to migrate, their presence is typically to be avoided.

Other ingredients may be incorporated into the compositions according to the present invention. For instance, processing aids can be added or colorants, as well as antioxidants and other stabilizing ingredients to protect the compounds from degradation induced by heat, light and processing or during storage.

Preparation of the Composition

No particular limitation is imposed on the preparation process of the compound of the present invention. Therefore, there may be used any process such as a mechanically mixing process: e.g., a Banbury mixer or a twin-screw extruder provided with adequate mixing elements, thereby obtaining an intimate mixture of the ingredients.

Use of the Composition

Compositions according to the present invention may be applied, e.g. by extrusion, for the preparation of fibers, filaments and melt blown or spun bond non-wovens or cast or blown films.

The present invention will hereinafter be described more specifically by reference to the following examples and comparative examples. However, this invention is not limited to these examples only. Incidentally, all designations of "part" or "parts" and "%" as will be used in the following examples mean part or parts by weight and percentage by weight unless expressly noted. The measurements of physical properties were conducted in accordance with the following methods.

Test Methods melt flow rate (MFR): ASTM D1238-95 (230° C., 2.16 kg)
tensile properties on fibers:
hysteresis: strands produced by melt index tester are clamped in a mechanical tester (Zwick). Strands are elongated to 150% extension at a speed of 100 mm/sec (load step), and immediately relaxed to zero force (unload step). A second cycle follows right after the first one. Forces at 50 and 100% elongation are recorded for the first cycle. Hysteresis is measured as the difference in energy between the load and the unload step. Permanent set is measured as the difference between the original sample length of the first cycle (force equals zero) and the sample length before the second cycle (force equals zero).
stress-relaxation: strands produced by melt index tester are clamped in a mechanical tester (Zwick). Strands are elongated to 50% extension, in a hot-air oven at 40° C. The samples are held in that position for 2 hrs. The force decay is measured. The stress-relaxation is expressed as the ratio between the final force and the initial force (equaling the percentage of retained stress).
tensile properties according to ASTM D882-81 (tested on films)

TABLE 1

| (ingredients) |
| --- |
| Styrenic Block copolymers: |

| | |
| --- | --- |
| SBC A comp. | A linear SEBS having a diblock content of about 30%; a PSC of 13.3%, a MW (PS) of about 5,300; an apparent MW of about 145,000 and a vinyl content of 45% |
| SBC B | A linear SEBS having a PSC of 21%, a MW (PS) of about 8,000; an apparent MW of about 115,000 and a vinyl content of 65% |
| SBC C comp. | A linear SEBS having a PSC of 20.5%, a MW (PS) of about 10,000; an apparent MW of about 150,000 and a vinyl content of 68% |
| SBC D comp | A linear SEBS having a PSC of 30%, a MW (PS) of about 7,000; an apparent MW of about 80,000 and a vinyl content of 40% |

| Polyolefins: | |
| --- | --- |
| HF568X | "VALTEC" HH442H or "MOPLEN" HF568X, a PP having an MFR of 800 g/10 min and a Modulus of 1500 MPa |
| PA189V | "MiraePol" PA189V, a PP having an MRF of 900 g/10 min |

TABLE 1-continued (ingredients)

Endblock compatible resins:

F-100  "KRISTALLEX" F-100; an alpha-methylstyrene resin

Midblock compatible resins

R-1125  "REGALITE" R-1125; a fully hydrogenated C9 hydrocarbon resin

EXAMPLES 1-6

Compositions for the preparation of fibers, non-wovens wovens use were prepared on a 25 mm Werner & Pfleiderer ZSK25 co-rotating twin-screw extruder with 49 L/D. The ingredients from Table 1 were pre-blended according to the amounts in Table 2 in a Papenmeier internal mixer, and fed into one feeding port. Strands were cooled in a water-bath and granulated using a strand-cutter.

Strands were prepared with a Gottfert melt index tester as described in ASTM D-1238-95. The mechanical properties of these strands were measured, and the results are included in Table 2.

TABLE 2 composition

| | Examples | | | | | |
|---|---|---|---|---|---|---|
| | 1 | 2 | 3 | 4 | 5 | 6 |
| SBC A comp | | | | | | 65 |
| SBC B | 60 | 65 | 65 | | | |
| SBC C comp | | | | | 65 | |
| SBC D comp | | | | 65 | | |
| HF568x | 20 | 15 | 20 | 20 | 20 | 20 |
| F-100 | 10 | 10 | 10 | 10 | 10 | 10 |
| R-1125 | 10 | 10 | 5 | 5 | 5 | 5 |
| Properties | | | | | | |
| MFR (g/10 min) | 49 | 37 | 30 | 27 | 11 | 1.5 |
| Stress Relaxation (%) | n.m | 42 | 40 | 38 | 41 | 56 |
| Permanent Set (%) | 17 | 12 | 14 | 24 | 23 | 11 |
| Modulus 50% | 3.17 | 2.32 | 3.18 | 2.64 | 4.31 | 2.16 |

CONCLUSION

The compound of Example 3 is based on the right polymer at the right amount. Accordingly, it has the right balance of properties. On the other hand, the compound of Example 1 has a very high MFR and a high modulus, but a permanent set that is too high. The compound of Example 2 has a good MFR and elasticity (stress-relaxation and permanent set), but a high flow and a too low modulus.

In Example 4 the composition has a good flow, but a too low modulus and no elasticity (bad hysteresis and stress-relaxation).

In Example 5 the composition has a very high modulus, a too low flow, and no elasticity (bad hysteresis; the stress-relaxation is acceptable).

In Example 6, the composition shows a very good elasticity (hysteresis and stress-relaxation) but a too low modulus and a very poor flow.

The invention claimed is:

1. A composition for the manufacture of fibers, filaments, melt blown or spun bond non-wovens or cast or blown films, comprising
   (1) at least 50 wt % of a styrenic block copolymer, having a molecular structure according to the general formula S-EB-S(1) or (S-EB)$_n$X(2), wherein each S independently is a polymer block of predominantly styrene and EB is a hydrogenated polymer block of predominantly butadiene, n is an integer equal to or greater than 2, and X is the residue of a coupling agent, having a poly(styrene) content in the range of from 10 to 29 wt %, having poly(styrene) blocks (S) of an apparent molecular weight in the range of from 6,000 to 9,000, having an apparent molecular weight of the complete block copolymer in the range of from 80,000 to 150,000, having an 1,2-addition degree (vinyl content) in the precursor of the poly (butadiene) block (EB) in the range of from 60 to 80% (mole/mole), wherein the block EB has a hydrogenation degree of at least 80%, and wherein diblock S-EB optionally occurs in a content of at most 20 mole %;
   (2) a polyolefin in an amount of from 10 to 30 wt %;
   (3) a resin which is compatible with the poly(styrene) blocks selected from coumarone-indene resin, polyindene resin, poly(methyl indene) resin, polystyrene resin, vinyltoluene-alphamethylstyrene resin, alphamethylstyrene resin, and polyphenylene ether in an amount of at least 5 wt %, and
   (4) a resin which is compatible with the hydrogenated polybutadiene blocks selected from compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof in an amount of at least 3 wt %,
   wherein all weight percentages are relative to the weight of the complete composition.

2. The composition of claim 1, wherein the poly(styrene) content is in the range of from 17 to 24 wt %.

3. The composition of claim 2, wherein the poly(styrene) blocks (S) have an apparent molecular weight in the range of from 7,000 to 8,500.

4. The composition of claim 1, wherein the polyolefin is a polypropylene having a melt flow rate greater than 400 gr/10 min (according to ASTM D1238-95).

5. The composition of claim 1, wherein the block EB of the block copolymer has a hydrogenation degree of at least 90%.

6. The composition of claim 4, wherein the block EB of the block copolymer has a hydrogenation degree of at least 95%.

7. The composition of claim 3, wherein the EB block precursor has an 1,2-addition degree (vinyl content) in the range of from 65 to 75%.

8. The composition of claim 6, wherein the EB block precursor has an 1,2-addition degree (vinyl content) in the range of from 65 to 75%.

9. The composition of claim 1, wherein any S-EB diblock occurs in a content of at most 10 mole %, relative to the total block copolymer amount.

10. The composition of claim 8, wherein any S-EB diblock occurs in a content of at most 10 mole %, relative to the total block copolymer amount.

11. The composition of claim 2 wherein the poly(styrene) blocks (S) have an apparent molecular weight in the range of from 6,000 to 7,000.

12. The composition of claim 11 wherein the apparent molecular weight of the complete block copolymer is in the range of from 100,000 to 150,000.

13. The composition of claim 12 wherein the 1,2-addition degree (vinyl content) in the precursor of the poly(butadiene) block (EB) is in the range of from 65 to 80% (mole/mole).

14. The composition of claim 12 wherein the 1,2-addition degree (vinyl content) in the precursor of the poly(butadiene) block (EB) is in the range of from 75 to 80% (mole/mole).

15. The composition of claim 14 wherein the block EB has a hydrogenation degree of at least 90%.

16. The composition of claim 15 wherein the polyolefin is a polypropylene having a melt flow rate greater than 400 gr/10 min (according to ASTM D1238-95).

17. Fibers, filaments, melt blown or spun bond non-wovens or cast or blown films, derived from a composition comprising
(1) at least 50 wt % of a styrenic block copolymer, having a molecular structure according to the general formula S-EB-S(1) or (S-EB)$_n$ X(2), wherein each S independently is a polymer block of predominantly styrene and EB is a hydrogenated polymer block of predominantly butadiene, n is an integer equal to or greater than 2, and X is the residue of a coupling agent, having a poly(styrene) content in the range of from 10 to 29 wt %, having poly(styrene) blocks (S) of an apparent molecular weight in the range of from 6,000 to 9,000, having an apparent molecular weight of the complete block copolymer in the range of from 80,000 to 150,000, having an 1,2-addition degree (vinyl content) in the precursor of the poly (butadiene) block (EB) in the range of from 60 to 80% (mole/mole), wherein the block EB has a hydrogenation degree of at least 80%, and wherein diblock S-EB optionally occurs in a content of at most 20 mole %;
(2) a polyolefin in an amount of from 10 to 30 wt %;
(3) a resin which is compatible with the poly(styrene) blocks selected from coumarone-indene resin, polyindene resin, poly(methyl indene) resin, polystyrene resin, vinyltoluene-alphamethylstyrene resin, alphamethylstyrene resin, and polyphenylene ether in an amount of at least 5 wt %, and
(4) a resin which is compatible with the hydrogenated polybutadiene blocks selected from compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof in an amount of at least 3 wt %,
wherein all weight percentages are relative to the weight of the complete composition; processing aids; and stabilizing ingredients.

18. The fibers, filaments, melt blow or spun bond non-wovens or cast or blown films of claim 17 wherein the poly(styrene) blocks (S) have an apparent molecular weight in the range of from 6,000 to 7,000.

19. The fibers, filaments, melt blow or spun bond non-wovens or cast or blown films of claim 18 wherein the apparent molecular weight of the complete block copolymer is in the range of from 100,000 to 150,000.

20. The fibers, filaments, melt blow or spun bond non-wovens or cast or blown films of claim 19 wherein the 1,2-addition degree (vinyl content) in the precursor of the poly(butadiene) block (EB) is in the range of from 65 to 80% (mole/mole).

21. The fibers, filaments, melt blow or spun bond non-wovens or cast or blown films of claim 19 wherein the 1,2-addition degree (vinyl content) in the precursor of the poly(butadiene) block (EB) is in the range of from 75 to 80% (mole/mole).

22. The fibers, filaments, melt blow or spun bond non-wovens or cast or blown films of claim 21 wherein the block EB has a hydrogenation degree of at least 90%.

23. The fibers, filaments, melt blow or spun bond non-wovens or cast or blown films of claim 22 wherein the polyolefin is a polypropylene having a melt flow rate greater than 400 gr/10 min (according to ASTM D1238-95).

24. The composition of claim 17, wherein the poly (styrene) content is in the range of from 17 to 24 wt %.

25. The composition of claim 24, wherein the poly (styrene) blocks (S) have an apparent molecular weight in the range of from 7,000 to 8,500.

26. The composition of claim 17 wherein the polyolefin is a polypropylene having a melt flow rate greater than 400 gr/10 min (according to ASTM D1238-95).

27. The composition of claim 17, wherein the block EB of the block copolymer has a hydrogenation degree of at least 90%.

28. The composition of claim 26, wherein the block EB of the block copolymer has a hydrogenation degree of at least 95%.

29. The composition of claim 25, wherein the EB block precursor has an 1,2-addition degree (vinyl content) in the range of from 65 to 75%.

30. The composition of claim 28, wherein the EB block precursor has an 1,2-addition degree (vinyl content) in the range of from 65 to 75%.

31. The composition of claim 17, wherein any S-EB diblock occurs in a content of at most 10 mole %, relative to the total block copolymer amount.

32. The composition of claim 30, wherein any S-EB diblock occurs in a content of at most 10 mole %, relative to the total block copolymer amount.

* * * * *